United States Patent
Hassel et al.

(10) Patent No.: US 6,284,836 B1
(45) Date of Patent: Sep. 4, 2001

(54) AQUEOUS POLYURETHANE DISPERSIONS

(75) Inventors: Tillmann Hassel, Pulheim; Juergen Meixner, Krefeld; Thomas Muenzmay, Dormagen; Juergen Reiners; Jörg Schoob, both of Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/411,096

(22) Filed: Oct. 4, 1999

(30) Foreign Application Priority Data

Oct. 16, 1998 (DE) ............................................. 198 47 791

(51) Int. Cl.[7] ................................ C08J 3/00; C08K 3/20; C08L 75/00; B05D 3/02; B32B 27/00

(52) U.S. Cl. .................. 524/591; 427/372.2; 427/385.5; 428/423.1; 524/839; 524/840

(58) Field of Search ..................................... 524/539, 839, 524/840, 591; 427/372.2, 385.5; 428/423.1

(56) References Cited

U.S. PATENT DOCUMENTS

| | | | |
|---|---|---|---|
| 3,479,310 | * 11/1969 | Dieterich et al. | 524/591 |
| 4,801,644 | * 1/1989 | Coogan | 524/839 |
| 5,252,697 | 10/1993 | Laas et al. | 540/49 |
| 5,342,915 | 8/1994 | Licht et al. | 546/71 |
| 5,432,228 | * 7/1995 | Hilken et al. | 524/591 |
| 5,503,714 | 4/1996 | Reiners et al. | 582/164.6 |
| 5,583,176 | 12/1996 | Haberle | 703/591 |
| 5,770,651 | 6/1998 | Träubel et al. | 524/591 |
| 5,852,106 | 12/1998 | Wilmes et al. | 807/591 |

FOREIGN PATENT DOCUMENTS

92/16576   10/1992 (WO).

* cited by examiner

Primary Examiner—Patrick D. Niland
(74) Attorney, Agent, or Firm—Joseph C. Gil; Richard E. L. Henderson

(57) ABSTRACT

Aqueous polyurethane dispersions containing a polyurethane, composed of a) at least one polyol having an average molecular weight, determined as the number average, of 500–6000 g/mol, preferably 1000 to 4000, in particular 1500 to 3000 g/mol, b) at least one polyol, preferably diol, having a molecular weight of less than 500 g/mol, preferably of 61 to 499 g/mol, c) at least one aliphatic polyisocyanate, preferably diisocyanate, d) at least one diol having a molecular weight of less than 450 g/mol, which carries one or more ionic groups and/or one or more potentially ionic groups, preferably at least one carboxyl group, e) at least one amine which is reactive towards NCO groups, carries hydroxyl groups and has an OH functionality of 1 to 6, f) water and optionally g) a monoalcohol, characterized in that the molar ratio of polyol of the component a) to the sum of the polyols b) and d) is 1:1.5 to 1:4, preferably 1:2 to 1:3, the molar ratio of the sum of the polyols a), b) and d) to the polyisocyanate c) is 1:1.1 to 1:2.5, preferably 1:1.2 to 1:1.7, the OH functionality of the polyurethane being 2 to 6, preferably 2 to 4, and the average molecular weight, determined as the number average, of the polyurethane being less than 15,000, preferably from 2500 to 10,000, in particular from 3000 to 7000, g/mol.

9 Claims, No Drawings

AQUEOUS POLYURETHANE DISPERSIONS

The invention relates to aqueous polyurethane dispersions, processes for their preparation, aqueous polyurethane systems containing them and their use for coating leather.

Polyurethane-based binders for the aqueous finishing of leathers are already known.

The finishing of leather imparts to the leather articles their fashion aspect and their suitability for use. Finishing is understood as meaning the application of binders, dyes, pigments, waxes, handle compositions and further auxiliaries, by customary application techniques, such as spraying, printing, pouring, knife-coating, application with a plush pad, to the tanned hide. This application may be effected in one coat but as a rule is carried out in a plurality of coats, further process steps, such as intermediate drying, plating, embossing, milling, being customary. After each application of a finish coat, the leathers are usually stacked. This is possible only if the freshly applied finish coat does not stick after drying. The technical possibilities for drying an aqueous finish coat on leather are limited; only 90° C. to—briefly—100° C. can be reached because otherwise the shrinkage temperature of the leather is exceeded. The drying time, too, is short.

Owing to these limitations, inherently film-forming polymer dispersions which, after drying on, give a nontacky finish coat having good mechanical strength are used in the aqueous finishing of leather.

However, such binders have substantial disadvantages; for example, the levelling is not optimum and the formation of a continuous film is made more difficult. In industrial finishing, an attempt is made to compensate these disadvantages by adding levelling assistants—so-called levellers. Good levelling and optimum film formation of the binders of a finish system are essential for obtaining the required aspect and fastness level of the finish. This applies in particular to the uppermost finish coat, the so-called top coat.

Such binders are polymer dispersions. Low molecular weight—non-film-forming—polyurethane dispersions have not been used to date in the aqueous finishing of leather because, after drying on, such products are tacky, preventing industrial use.

It was the object of the present invention to overcome these disadvantages. Surprisingly, an aqueous polyurethane dispersion has now been found which contains a polyurethane which is composed of:

a) at least one polyol, preferably one diol, having an average molecular weight, determined as the number average, of 500 to 6000 g/mol, preferably 1000 to 4000, in particular 1500 to 3000 g/mol, b) at least one polyol, preferably diol, having a molecular weight of less than 500 g/mol, preferably 61 to 499 g/mol, c) at least one aliphatic polyisocyanate, preferably diisocyanate, preferably having a molecular weight of less than 500 g/mol, preferably 112 to 400, in particular 168 to 262 g/mol, d) at least one diol having a molecular weight of less than 450 g/mol, which carries one or more ionic groups and/or one or more potentially ionic groups, preferably at least one carboxyl or carboxylate group, e) at least one amine which is reactive towards NCO groups, carries hydroxyl groups and has an OH functionality of 1 to 6, f) water and optionally g) a monoalcohol, characterized in that the molar ratio of polyol of the component a) to the sum of the polyols b) and d) is 1:1.5 to 1:4, preferably 1:2 to 1:3, the molar ratio of the sum of the polyols a), b) and d) to the polyisocyanate c) is 1:1.1 to 1:2.5, preferably 1:1.2 to 1:1.7, the OH functionality of the polyurethane being 2 to 6, preferably 2 to 4, and the average molecular weight, determined as the number average, of the polyurethane being less than 15,000, preferably from 2500 to 10,000, in particular from 3000 to 7000, g/mol.

In general, the polyols a) and b) have no ionic groups or potentially ionic groups, apart from terminal carboxyl groups in polyester polyols, a proportion of which cannot always be avoided in their preparation.

The following may be used as a suitable polyol of the component a) or as suitable polyols of the component a): polyesters, polyethers, polycarbonates and polyesteramides of the molecular weight range 500 to 6000.

For example, the following may be mentioned as such: reaction products of polyhydric, preferably dihydric, alcohols with preferably dibasic carboxylic acids. Instead of the polycarboxylic acids, the corresponding polycarboxylic anhydrides or corresponding polycarboxylic esters of lower alcohols or mixtures thereof may also be used for the preparation of the polyesters. The polycarboxylic acids may be of an aliphatic, cycloaliphatic, aromatic and/or heterocyclic nature and may be optionally substituted, for example by halogen atoms, and/or unsaturated. The following may be mentioned as an example thereof: succinic acid, adipic acid, suberic acid, azeleic acid, sebacic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids, such as oleic acids, optionally as a mixture with monomeric fatty acids, dimethyl terephthalate, bis-glycol terephthalate.

Suitable polyhydric alcohols are, for example, ethylene glycol, 1,2- and 1,3-propylene glycol, 1,4-, 1,3- and 2,3-butylene glycol, 1,6-hexanediol, 1,8-octanediol, neopentylglycol, cyclohexanedimethanol (1,4-bis-hydroxymethylcyclohexane), 2-methyl-1,3-propanediol, furthermore diethylene glycol, triethylene glycol, tetraethylene glycol, polyethylene glycol, dipropylene glycol, polypropylene glycol, dibutylene glycol, and polybutylene glycol. The polyesters may have a proportionate amount of terminal carboxyl groups. Polyesters obtained from lactones may also be used.

The particularly preferred polyester polyols, in particular polyester diols, are dicarboxylic acid polyester polyols whose dicarboxylic acid component comprises at least 50 carboxyl equivalent %, particularly preferably exclusively, adipic acid and whose polyol component preferably comprises at least 50 hydroxyl equivalent % of 1,4-dihydroxybutane, 1,6-dihydroxy-hexane, or neopentylglycol.

Polycarbonates having hydroxyl groups are also suitable as component a) or as part of the component a), for example those which can be prepared by reacting diols, such as 1,3-propanediol, 1,4-butanediol and/or 1,6-hexanediol, diethylene glycol, triethylene glycol, tetraethylene glycol, with dicarbonates, for example diphenyl carbonate or phosgene. Any mixtures of the polyhydroxy compounds mentioned by way of example may likewise be used as component a).

The following may be particularly preferably mentioned: dihydroxypolyesters of dicarboxylic acids or their anhydrides, e.g. adipic acid, succinic acid, phthalic anhydride, isophthalic acid, terephthalic acid, suberic acid, azeleic acid, sebacic acid, tetrahydrophthalic acid, maleic anhydride, dimeric fatty acids and diols, e.g. ethylene glycol, propylene glycol, 1,4-propanediol, diethylene glycol, triethylene glycol, 1,4-butanediol, 1,6-hexanediol, trimethylenepentanediol, 1,4-cyclohexanediol, 1,4-cyclohexanedimethanol, neopentyl glycol, 1,8-octanediol; polyesters and polycarbonates based on lactones, in particular based on ε-caprolactone, polycarbonates as obtainable by reacting, for example, the abovementioned diols with diaryl or dialkyl carbonates or phosgene. Polyethers, as can be obtained, for example, using diols or water as initiator molecule by polymerization with ethylene oxide and/or propylene oxide and by polymerization of tetrahydrofuran, are likewise suitable.

Particularly suitable polyols of the component a) are polycarbonate diols, polylactonecarbonate diols and polytetrahydrofuran diols.

Among these particularly suitable polyols, hexanediol-polycarbonate diols, caprolactone-hexanediol-polycarbonate diols and tetrahydrofuran diols are preferred, in particular those of the molar mass range 1000 to 3000 g/mol.

The following are suitable as preferred polyols, in particular diols of component b): ethylene glycol, 1,4-butanediol, 1,6-hexanediol, neopentyl glycol, trimethylpentanediol, propylene glycol, 1,3-propanediol, 1,4-cyclohexanedimethanol and mixtures thereof. 1,4-Butanediol is preferably used.

Suitable aliphatic isocyanates of the component c) are, for example, isocyanates such as, for example, hexamethylene diisocyanate, butane diisocyanate, isophorone diisocyanate, 1-methyl-2,4(2,6)-diisocyanato cyclohexane, norbornane diisocyanate, tetramethylxylylene diisocyanate, hexahydroxylylene diisocyanate, 4,4'-diisocyanatodicyclohexylmethane.

Preferably, 4,4'-diisocyanatodicyclohexylmethane and/or isophorone diisocyanate and/or hexamethylene diisocyanate and/or 1-methyl-2,4(2,6)-diisocyanatocyclohexane are used.

In particular, diols carrying carboxyl or carboxylate groups are suitable as the diol carrying ionic or potentially ionic groups, of the component d): 2,2-bis(hydroxymethyl) alkanecarboxylic acids, such as dimethylolacetic acid, 2,2-dimethylolpropionic acid, 2,2-dimethylolbutyric acid, 2,2-dimethylolpentanoic acid, dihydroxysuccinic acid.

Dimethylolpropionic acid is preferably used.

The amines of the component e) serve for introducing the terminal hydroxyl groups, the isocyanates reacting preferably exclusively with the amino group in the preparation process, explained further below, for the polyurethane dispersions according to the invention. Suitable compounds of the component e) are, for example, ethanolamine, propanolamine, N-methylethanolamine, diethanolamine, N,N,N'-tris-2-hydroxyethyl-ethylendiamine.

Ethanolamine and diethanolamine are preferably used.

The component f) serves for further increasing the molar mass of the dispersions, preferably after the dispersing. $NH_2$ groups are formed by reaction with the NCO groups and react with further NCO groups with an increase in molar mass by urea linkage.

In this application, polyurethanes are therefore also understood as meaning polyurethane ureas.

For example, monofunctional alcohols of the aliphatic or araliphatic series or corresponding polyether alcohols may be used as optionally present component g). The use of aliphatic alcohols is preferred, in particular $C_1$–$C_{10}$ alcohols.

For example, the following may be used: methanol, butanol, hexanol, 2-ethylhexanol, 2-methoxyethanol, diethylene glycol monomethyl ether and benzyl alcohol.

In a preferred embodiment, the molar ratio of the components e) and g) functioning as chain terminators is chosen so that the desired OH functionality of the polyurethane is established.

This is particularly preferably effected according to the relationship $$F(OH\text{-}PU) = \frac{\text{mol of }e)}{\text{mol of }e) + \text{mol of }g)} \cdot 2 \cdot F(OH \text{ of } e)$$

wherein

F (OH-PU) is the resulting OH functionality of the polyurethane, mol of e) denotes the molar amount used of amino alcohol of the component e), mol of g) denotes the molar amount used of monofunctional alcohol of component g) and F (OH of e)) indicates the OH functionality of the amino alcohol of the component e).

It is also preferable to adjust the absolute molar amount of the components e) and g) so that the resulting average number average molar mass of the polyurethane is less than 15,000 g/mol, preferably 2500 to 10,000, in particular 3000 to 7000 g/mol.

In a particular embodiment, the mean particle size of the polyurethane is less than 100 nm, preferably 20 to 80, in particular 30 to 60, nm.

The particle size is preferably determined by means of laser correlation spectroscopy.

It is also preferable if the content of the ionic groups, in particular the carboxylate groups, of the polyurethane is 5 to 200, preferably 10 to 100, in particular 20 to 60, milliequivalents, based on 100 g of the polyurethane.

Further preferred polyurethane dispersions according to the invention preferably optionally contain organically coated silicic acids, preferably having a mean particle size of 1 to 10 $\mu$m, in particular of 2 to 7 $\mu$m, preferably having an oil number of 150 to 400 according to ISO 787/5.

The particle size is determined in general by transmission electron microscopy.

Preferably, the solids ratio of polyurethane of the dispersion to silicic acid is 2:1 to 5:1. Likewise preferably, the residue on ignition of such a dispersion is 1 to 8%.

It is also preferable for the polyurethane dispersions according to the invention to contain further additives. Suitable such additives are, for example, further binders, for example polyurethane-based or acrylate-based latices.

Other further additives may be viscosity regulators, further organic bases for pH adjustment, antifoams and microbicides for stabilization. Such additives are used in general in minor amounts; the amounts are preferably 100 ppm to 5%, based on the dispersion.

The invention furthermore relates to a process for the preparation of the polyurethane dispersion according to the invention, which process is characterized in that the components a), b), c), d) and optionally g) are reacted to give an NCO prepolymer and this is reacted with the components e) and water to give a polyurethane having an OH functionality of 2 to 6.

Preferably, the molar sum of the components e) and g), based on 1000 g of prepolymer, is at least 0.134 mol; preferably 0.2 to 0.8 mol, particularly preferably 0.286 to 0.66 mol.

In a preferred embodiment, the process is characterized in that either an NCO prepolymer is synthesized from the components a), d) and optionally g) with the polyisocyanate c) and the NCO prepolymer is subsequently reacted with the component b) and then the optionally present potential ionic groups, in particular carboxyl groups, are neutralized with a base not reactive towards NCO groups, and the neutralized prepolymer is reacted with water and the component e), or an NCO prepolymer is prepared by reacting a mixture containing the components a), b), d), g) and c), then the optionally present potentially ionic groups, in particular carboxyl groups, are neutralized by adding a base not reactive towards NCO groups, and the neutralized prepolymer is reacted with water and the component e).

The process according to the invention is preferably carried out by the melt dispersing method. The melt dispersing method is characterized in that an NCO prepolymer—either as a melt or as a solution in a non-NCO reactive, water-miscible solvent—containing an amount of incorporated ionic groups sufficient for forming a stable dispersion—or potentially ionic groups converted into ionic groups by prior neutralization—is either stirred into water or water is stirred into the prepolymer.

In general, a stable emulsion of the prepolymer forms thereby. The NCO groups can then either react by reaction with water; it is also possible, however, to react them with water-miscible (poly)amines.

Particularly suitable for this process are prepolymers having aliphatic NCO groups.

Organic solvents which are not NCO-reactive and miscible with water are preferably used in the prepolymer preparation in the process according to the invention.

For example, the following may be mentioned as suitable solvents: ketones, such as acetone and butanone; ethers, such as tetrahydrofuran, dioxane and dimethoxyethane, ether esters, such as methoxypropyl acetate; (cyclic) amides and ureas, such as dimethylformamide, dimethylacetamide, N,N'-dimethyl-2,5-diazapentanone and particularly N-methylpyrrolidone.

These solvents may be added at any stage of the prepolymer preparation.

However, the procedure in which the solvent is present from the beginning is particularly advantageous.

The prepolymer preparation is preferably effected at temperatures from 50 to 120° C., particularly preferably 60 to 110° C. The neutralization is preferably carried out at 60 to 90° C.

The component e) is preferably used in the presence of a 10- to 60-fold excess of water by weight. This is preferably ensured by introducing, preferably stirring in, the component e) together with the excess of water into the NCO prepolymer, or by first dispersing the NCO prepolymer in water, preferably at a temperature of 40 to 60° C., and, after dispersing, adding the component e), optionally as an aqueous solution.

This process variant is preferably carried out in a manner such that first water is initially taken and the NCO prepolymer is introduced. After the addition of the component e), stirring is carried out preferably until the reaction product is NCO-free.

The component g) is preferably reacted with the NCO prepolymer, even before the NCO prepolymer is dispersed in water.

Optionally present potential ionic groups, in particular the carboxyl groups of the NCO prepolymer, are also preferably neutralized before the NCO prepolymer is dispersed in water.

Suitable bases not reactive towards NCO groups are preferably tertiary amines, in particular the tertiary amines such as trimethylamine, triethylamine, N-methylmorpholine, N-methylpiperidine or N,N-dimethyl-N-[2-ethoxy]-ethylamine.

The invention furthermore relates to an aqueous polyurethane system containing:

A) at least one aqueous polyurethane dispersion according to the invention and

B) at least one water-dispersible, aliphatic or cycloaliphatic polyisocyanate having an NCO functionality of at least 2, preferably 2 to 6, in particular 2.3 to 4, the ratio of the OH groups of the component A) to the NCO groups of the component B) being 1:1 to 1:4, preferably 1:1.2 to 1:3.

Water-dispersible isocyanates are preferably understood as meaning those which can be distributed in an aqueous system with only moderate shear forces—in extreme cases by simple stirring—and give a finely divided emulsion which is stable for at least a few hours.

Such polyisocyanates are known; for example, as a result of modification with hydrophilic polyethers and/or as a result of ionic modification, they contain an internal emulsifier system, which permits emulsification.

Preferred polyisocyanates of the component B) are polyether-modified or ionically modified biurets, allophanates, trimerized products of hexamethylene diisocyanate (HDI) or of isophorone diisocyanate (IPDI). Nonionic polyisocyanates which are modified with the aid of polyethers are particularly preferred. Polyisocyanate mixtures obtainable with polyethylene oxide polyether alcohols having on statistical average less than 10 ethylene oxide units are suitable, for example, as such aliphatic or cycloaliphatic polyisocyanates. Such mixtures are disclosed, for example, in EP-A 540 985.

In addition to these purely nonionic hydrophilized, polyetherurethane-containing polyisocyanates, polyether-modified water-dispersible polyisocyanates are also known and additionally have ionic groups, for example sulphonate groups (cf. for example EP-A 703 255) or amino or ammonium groups (cf. for example EP-A 582 166) for improving the emulsifiability or for achieving special effects.

For example, the following may be mentioned as suitable polyisocyanates of the component B):

reaction product of 80 parts of HDI trimerisation product with 20 parts of an ethanol-initiated EO polyether having an average molecular weight of 350 g/mol;

reaction product of 90 parts of HDI trimerisation product with 10 parts of a methanol-initiated EO polyether having an average molecular weight of 70 g/mol;

reaction product of 85 parts of HDI trimerisation product with 15 parts of a butanol-initiated EO/PO block copolyether having an EO/PO ratio of 7:3 and an average molar mass of 2250 g/mol;

reaction product of 83 parts of HDI biuret and 17 parts of a methanol-initiated EO polyether having an average molar mass of 650 g/mol;

reaction product of 87 parts of IPDI trimerisation product with 13 parts of a 2:1 mixture of methanol-initiated EO polyethers having an average molar mass of 350 and 750 g/mol;

reaction product of 80 parts of HDI trimerisation product with 3 parts of triethylene glycol and 17 parts of an ethanol-initiated EO polyether having an average molar mass of 550 g/mol;

reaction product of 87 parts of HDI trimerisation product with 0.2 part of N,N-dimethylethanolamine and 16.9 parts of a methanol-initiated EO polyether having an average molar mass of 350 g/mol, the tertiary amino group being protonated with dibutylphosphoric acid after the reaction;

reaction product of 85 parts of HDI trimerisation product with 5 parts of the ethoxylated sodium salt of 1,4-butanediol-2-sulphonic acid (average molar mass 368 g/mol) and 10 parts of an ethanol-initiated EO polyether having an average molar mass of 370 g/mol.

The polyurethane systems according to the invention may contain further auxiliaries and additives, such as, for example, inorganic and organic pigments, dyes, levelling agents, ionic and nonionic viscosity regulators, natural and synthetic waxes, antifoams and silicone and non-silicone handle compositions.

When used preferably in the aqueous polyurethane system according to the invention, the aqueous polyurethane dispersions according to the invention give, in particular on leather, a coating which dries sufficiently rapidly under the customary technical conditions of leather production. These coatings have in particular good wet rub fastnesses and high wet and dry flexing endurances.

The leathers coated in this manner present no problems in particular during plating, embossing or stacking.

The aqueous polyurethane systems are also referred to as 2-component polyurethane finishes.

After application to substrates, such as, for example, metal, wood, paper, textile, plastic and in particular leather, and drying, the aqueous polyurethane systems give a continuous film or a homogeneous, defect-free coating which has correspondingly high wet rub fastnesses.

The polyurethane system according to the invention has extremely good levelling properties, which in turn leads to very clear finishes which do not impose a stress on the grain. This permits very elegant, aniline-like finishes.

The polyurethane system according to the invention is likewise advantageous if it additionally contains conventional high molecular weight latices.

The 2-component finish system according to the invention gives finishes having a clear surface. However, substrates, in particular leather, having a matt surface may also be demanded by fashion trends. To meet these requirements, it is advantageous to use binders of the component A) containing optionally organically coated silicic acids. The silicic acids produce a matt finish surface and they act as dulling agents.

The invention therefore furthermore relates to the use of the aqueous polyurethane system for coating a very wide range of substrates, preferably wood, paper, textile, plastic or metal, in particular leather.

The present invention likewise relates to the substrates coated with the aqueous polyurethane system according to the invention.

The invention furthermore relates to a process for coating substrates, in particular leather, which is characterized in that aqueous polyurethane systems are applied to substrates.

EXAMPLES

Example 1

94.5 g of a linear hexanediol caprolactone carbonate diol having an average molar mass of 2000 g/mol, 283.5 g of a $C_4$-polyetherdiol having a molar mass of 2000 and 25.4 g of dimethylolpropionic acid are initially introduced into a 1 l flask having a stirrer and $N_2$ blanketing and are dewatered for 30 min at 120° C.

Thereafter, 140.6 g of N-methylpyrrolidone are added and cooling to 70° C. is effected. 27.16 g of 1,4-butanediol are added.

At 70° C., 98.9 g of isophorone diisocyanate and 122.6 g of 4,4'-diisocyanatodicyclohexylmethane are added while stirring. Stirring is carried out at 105 to 110° C. until the NCO content has decreased to 2.46%. Cooling to 80° C. is effected, and a mixture of 17.7 g of triethylamine and 17.7 g of N-methylpyrrolidone is stirred in. After stirring for a further 15 min, the product is introduced into 900 g of water at 40° C. with vigorous stirring. A dispersion of the prepolymer forms.

After 5 min, 28.5 g of diethanolamine, dissolved in 90 g of water, are introduced into this dispersion while stirring. Vigorous stirring is continued for 20 min, after which the dispersion is stirred for a further 9 hours at moderate stirring speed and 50° C.

A finely divided dispersion results, having the following characteristics:

solids content (SC): 37.8%
particle size (measured by laser correlation spectroscopy (LCS)): 60 nm
OH functionality: 4
number average molar mass: 5145 g/mol

Example 2

Example 1 is repeated, except that a mixture of 283.5 g of the caprolactone/hexanediol polycarbonate diol and 94.5 g of the $C_4$-polyether diol is used as macrodiols.

A finely divided dispersion results, having the following characteristics:

SC: 37.8
particle size LCS: 62.3 nm
OH functionality: 4
average molar mass: 5145 g/mol

Example 3

400 g of the hexanediol/caprolactone polycarbonate diol from Example 1 and 27 g of dimethylolpropionic acid are initially introduced into a 2 l reaction flask having a heater and stirrer and are dewatered at 110° C. while stirring for 30 min in vacuo.

At 100° C., 104.8 g of isophorone diisocyanate and 129.7 g of 4.4'-diisocyanato-dicyclohexylmethane are added rapidly in succession. Stirring is effected at 105° C. After 2 h, an NCO value of 7.18% has been reached.

Cooling to 80° C. is effected, 167.5 g of N-methylpyrrolidone are added and stirring is effected for 10 min. 28.7 g of butanediol are added to the now homogeneous mixture. Stirring is effected at 80°. After a further 3 h, the NCO content has decreased to 2.42%. 19.5 g of triethylamine are then stirred in at 75° C. Stirring is continued for 15 min.

The solution at 75° C. is then rapidly introduced into 1120 g of water which has been initially introduced into a 4 l sulphonation beaker and has been heated to 45° C.

During the introduction, vigorous stirring is carried out. An emulsion forms. A solution of 27 g of diethanolamine in 100 g of water is introduced into this emulsion with further vigorous stirring. After the addition of all components, a mixing temperature of 55° C. has established. Stirring is continued for 9 hours at a reduced stirring speed, the temperature being kept at 50° C. A dispersion having the following characteristic forms:

SC: 35%
Particle size LCS: 52 nm
OH functionality 4
Number average molar mass: 5730 g/mol

Example 4

The experiment of Example 3 is repeated with the following variation:

The polycaprolactone/hexanediol polycarbonate diol and the dimethylolpropionic acid are initially introduced together and dewatered. Thereafter, the N-methylpyrrolidone is added and stirred until a clear solution is obtained. The butanediol is stirred into the solution. At 60° C., isophorone diisocyanate and 4,4'-diisocyanatodicyclohexylmethane are rapidly added while stirring. After the addition, stirring is effected at 80° C. After 2.5 hours, an NCO content of 2.42% has been reached.

The procedure is then continued exactly as in Example 3. A dispersion having the following characteristics results:
SC: 35%
Particle size LCS: 45 nm
OH functionality: 4
Number average molar mass: 5730 g/mol

Example 5

600 g of caprolactone/hexanediol polycarbonate diol and 40.5 g of dimethylolpropionic acid are initially introduced into a 2 l flask having a stirrer and heater and are dewatered for 1 h at 10° C. in vacuo.

Thereafter, 251 g of N-methylpyrrolidone and 43 g of 1,4-butanediol are added and homogenized. 7.3 g of 2-ethylhexanol are added to the clear solution now at 60° C.

194.5 g of 4.4'-diisocyanato-dicyclohexylmethane and 157.2 g of isophorone diisocyanate are added rapidly in succession to the clear solution while stirring. Heating to 90° C. is effected and stirring is carried out at this temperature. After 3 h, an NCO value of 2.24% has been reached. Cooling to 75° C. is effected. At this temperature, 29.3 g of triethylamine are stirred in and stirring is continued for 10 min.

The solution, at 75° C., of the neutralized prepolymer is stirred, in the course of 5 min, into 1350 g of water at 45° C., which have been initially introduced into a 4 l sulphonation beaker having an effective stirrer. Thereafter, a solution of 46.6 g of diethanolamine in 300 g of water is immediately added to the resulting emulsion of the prepolymer. Vigorous stirring is carried out for a further 10 min and stirring is then carried out for a further 10 hours at a temperature of 50° C. at moderate stirring speed.

The dispersion obtained has the following characteristics:
SC: 36%
Particle size LCS: 35 nm
OH functionality: 3.55
Number average molar mass: 4356 g/mol

Example 6
Formulation with Silicic Acid 608 g of product from Example 5 were initially introduced into a 2 l beaker having a dissolver disc. The pH was adjusted to 8.0 with monoethanolamine. 0.5 g was required for this purpose. The product was diluted with 321 g of demineralized water. 70 g of a thermal silicic acid having a mean particle size of 4 μm and an oil number of 360 were then introduced at minimum rotary speed. After the material had been stirred in and thoroughly wet, the dissolver speed was increased and dispersing was effected for 20 min without cooling. After the addition of 0.5 g of tributyl phosphate, stirring was continued for a further 20 min at low speed. Filtration was then effected over a 50 μm nylon cloth.

A stable formulation with 7% silicate content and 21.8% binder dry matter resulted. On standing, the formulation became viscous—it can almost be turned out. As a result of gentle stirring or shaking, it immediately assumed a flowable consistency again.

Use Examples
Materials Used

The components of the primer formulation are the following:

1.1 Wash primer: 20% strength aromatic, anionic, soft polyether-polyurethane dispersion having the following properties: 100% modulus: 0.4 MPas, tensile strength: 5.7 MPas at 1150% elongation.

1.2 Colour: formulation containing 26% of carbon, 0.2% of a sheet silicate and 8.6% of a polyacrylic acid neutralized with ethanolamine.

1.3 Levelling agent containing 2.5% of a sheet silicate, 1.5% of a nonfunctional silicone and neat's foot oil (1.5%) and 3.3% of casein. The formulation is rendered alkaline with ammonia.

1.4 Detackifier emulsion containing 5% of wool fat, 20% of associative polyurethane thickener and 1% of high-boiling aromatics blend.

1.5 Acrylate dispersion, 35% strength, having the following properties: 100% modulus: 0.3 MPas, tensile strength: 4.0 MPas at 880% elongation.

1.6 Medium-hard 40% strength aliphatic-aromatic polyester-polyurethane dispersion having the following properties: 100% modulus, 4.7 MPas, tensile strength: 33 MPas at 600% elongation.

I. Substrate

For all tests on leather, an upholstery leather bottomed according to the following formulation was used.

A bottoming is supplied as follows to unfinished upholstery nappa leather from cattle hide:

The leather is first pre-bottomed with a formulation of 300 parts of a commercial polyurethane wash primer (1.1), 100 parts of isopropanol and 600 parts of water (spray a cross).

For bottoming, a mixture of 75 parts of the colour (1.2), 75 parts of a dry-setting levelling agent (1.3), 50 parts of a soft-setting detackifier (1.4), 150 parts of a commercial soft acrylate dispersion (1.5); 150 parts of a medium-hard polyurethane dispersion (1.6) and 475 parts of water is prepared. This mixture is sprayed twice (one cross each) onto the pre-bottomed leather. Drying is effected for 5 min at 70° C. The leather is hydraulically plated (80° C., 200 bar, 6 sec) and a further spray application of the above mixture (one cross) is then applied. After drying, plating is effected again (80° C., 50 bar, kiss plate). The leather bottomed in this manner is used as a substrate for the production of the test specimens.

II Crosslinking Agents of the Component c)

IIc1 a commercial polyether-modified 100% strength HDI trimerisation product having an NCO content of 17.5% and an NCO functionality of 2.8; and IIc2 the solvent formulation of a polyether-modified HDI trimerisation product having an NCO content of 12.5% and an NCO functionality of 2.7 were used as crosslinking agents.

III Conventional Latices

The following were used:

IIIa a 30% strength, medium-hard (65 Shore A) PUR dispersion of an anionic PUR for finishing, having the following film data: 100% modulus: 4.2 MPas; tensile strength: 42.1 MPas at 560% elongation IIIb a very hard (>90 Shore A) 40%ige strength PUR dispersion of an anionic PUR for finishing, having the following film data: 100% modulus: 17.5 MPas; tensile strength: 37.3 MPas at 280% elongation.

The physical leather fastnesses were determined according to DIN 53 351 (flexing fastnesses) or DIN 53 399 (rub fastnesses).

Example 7

The dispersion in Example 1 was formulated with water and crosslinking agent IIc2 so that a formulation having 12% PUR solids content and containing 4.0% of crosslinking agent resulted. This corresponds to an OH/NCO ratio of 1:1.32. This formulation was sprayed in an amount of 5 g per ¼ square foot onto the bottomed leather. Drying was effected for 5 min at 80° C. in a forced-circulation drying oven, after which plating was effected on a continuous plating machine at 100° C. roller temperature, 50 bar pressure and 6 m per minute. The test specimen fell easily off the roller.

The following fastnesses resulted:

Wet rub fastness: >1000 without damage; dry and wet flexing fastnesses with $10^6$ and $2 \times 10^5$, respectively, without objection.

Example 8

A formulation which is 12% strength in solids of the dispersion and 2.6% strength in crosslinking agent IIc1 is prepared from the dispersion of Example 4 and crosslinking agent IIc1 with water. This corresponds to an OH/NCO ratio of 1:1.29. This formulation is applied as in Example 7 to the bottomed leather, dried and plated.

The following fastnesses resulted: Wet rub fastness: 960; felt slightly stained, finish not noticeably damaged. Dry and wet flexing fastnesses $10^6$ and $2 \times 10^5$, respectively, without anomalies.

Example 9

A formulation comprising 12% of total solids of the dispersions and 1.5% of crosslinking agent IIc2 is prepared from the conventional PUR dispersion IIIb and the dispersion of Example 4, the solids ratio IIIb/dispersion 4 being 85:15. The ratio of the number of equivalents of OH/NCO, based on the dispersion from Example 4 is 1:3,7. The formulation is applied and tested as in Examples 7–8.

Wet rub fastness: 450, incipient staining of felt, dry and wet flexing fastnesses satisfactory at $10^6$ and $2 \times 10^5$, respectively.

The pure IIIb dispersion sprayed with the same solids content and the same amount of crosslinking agent in comparison give a wet rub fastness of only 160.

Example 10

A mixture of 372 g of silicate formulation from Example 6, and 178 g of dispersion from Example 5 is slightly increased in viscosity with 45 g of a 9% strength solution of a commercial acrylate thickener. A preemulsion of 40 g of crosslinking agent IIc2 and 40 g of water is stirred in and furthermore homogenized with 30 g of methoxypropyl acetate. The ready-to-spray mixture has an OH/NCO ratio of 1:1.3. 1 cross is sprayed on the bottomed leather, after which intermediate drying is effected for 5 min at 80° C. and a further cross is sprayed. Spraying is continued until moisture is visible. Drying is again effected for 5 min at 80° C. The resulting pattern had a velvety black aspect.

The following fastnesses were determined: Wet rub fastness: 18,000 up to initial felt staining, dry flexing fastness: 75,000 without damage, $10^6$ with very slight tears. The leather showed no greying in the fold.

Example 11

A mixture of 372 g of silicate formulation from Example 6 and 140 g of the PUR dispersion IIIa is prepared analogously to Example 10, and 45 g of the 9% strength solution of the acrylate thickener are added to said mixture. Thereafter 80 g of the crosslinking emulsion from Example 10 and 30 g of methoxypropyl acetate are stirred in. The mixture is applied as in Example 10 to the bottomed test leather. The resulting pattern had a matt, but not grey, surface.

The following fastnesses were obtained: Wet rub fastness: 1000 without visible damage to the finish or staining of the felt. Dry flexing fastness: 75,000 without damage in the fold, initial fine tears at $10^6$ flexes, no grey break.

What is claimed is:

1. An aqueous polyurethane dispersion comprising a polyurethane having an OH functionality of 2 to 6 and a number average molecular weight of less than 15,000 prepared by reacting (a) at least one polyol having a number average molecular weight of 500 to 6000 g/mol, (b) at least one polyol having a molecular weight of less than 500 g/mol, (c) at least one aliphatic polyisocyanate, (d) at least one diol having a molecular weight of less than 450 g/mol and bearing one or more ionic groups and/or one or more potentially ionic groups, (e) at least one amine that is reactive towards NCO groups, bears hydroxyl groups, and has an OH functionality of 1 to 6, (f) water, and (g) a $C_1$–$C_{10}$ aliphatic monoalcohol, wherein the molar ratio of polyol (a) to the sum of polyol (b) and diol (d) is 1:1.5 to 1:4 and the molar ratio of the sum of polyol (a), polyol (b), and diol (d) to polyisocyanate (c) is 1:1.1 to 1:2.5.

2. An aqueous polyurethane dispersion according to claim 1 wherein the mean particle size of the polyurethane is less than 100 nm.

3. An aqueous polyurethane dispersion according to claim 1 wherein the content of the ionic groups of the polyurethane is 5 to 200 milliequivalents per 100 g of the polyurethane.

4. An aqueous polyurethane dispersion according to claim 1 additionally comprising organically coated silicic acids.

5. A process for preparing an aqueous polyurethane dispersion according to claim 1 comprising (1) reacting components (a), (b), (c), (d), and (g) to form an NCO prepolymer, and (2) reacting the NCO prepolymer with components (e) and (f) to give a polyurethane having an OH functionality of 2 to 6.

6. An aqueous polyurethane system comprising (A) at least one aqueous polyurethane dispersion according to claim 1 and (B) at least one water-dispersible aliphatic or cycloaliphatic polyisocyanate having an NCO functionality of at least 2, wherein the ratio of the OH groups of component (A) to the NCO groups of component (B) is 1:1 to 1:4.

7. A method of coating a substrate comprising applying an aqueous polyurethane system according to claim 6 to the substrate.

8. A method according to claim 7 wherein the substrate is wood, textile, paper, plastic, metal, or leather.

9. A substrate coated with at least one aqueous polyurethane system according to claim 6.

* * * * *